(12) United States Patent
Taghibakhsh

(10) Patent No.: US 10,775,500 B2
(45) Date of Patent: Sep. 15, 2020

(54) ULTRASONIC TRANSDUCER PIXEL READOUT CIRCUITRY AND METHODS FOR ULTRASONIC PHASE IMAGING

(71) Applicant: QUALCOMM Incorporated, San Diego, CA (US)

(72) Inventor: Farhad Taghibakhsh, Cupertino, CA (US)

(73) Assignee: QUALCOMM Incorporated, San Diego, CA (US)

(*) Notice: Subject to any disclaimer, the term of this patent is extended or adjusted under 35 U.S.C. 154(b) by 553 days.

(21) Appl. No.: 15/704,337

(22) Filed: Sep. 14, 2017

(65) Prior Publication Data

US 2019/0079186 A1 Mar. 14, 2019

(51) Int. Cl.
| | |
|---|---|
| *G01S 15/89* | (2006.01) |
| *B06B 1/06* | (2006.01) |
| *G01S 7/52* | (2006.01) |
| *G06K 9/00* | (2006.01) |
| *H04N 5/374* | (2011.01) |

(52) U.S. Cl.
CPC ........ *G01S 15/8918* (2013.01); *B06B 1/0622* (2013.01); *B06B 1/0688* (2013.01); *G01S 7/52025* (2013.01); *G01S 15/8925* (2013.01); *G06K 9/0002* (2013.01); *H04N 5/374* (2013.01)

(58) Field of Classification Search
CPC ............. G01S 15/8918; G01S 7/52025; G01S 15/8925; B06B 1/0688; B06B 1/0622; H04N 5/374; G06K 9/0002
See application file for complete search history.

(56) References Cited

U.S. PATENT DOCUMENTS

| | | | |
|---|---|---|---|
| 5,014,711 A | * | 5/1991 | Nagasaki ................. A61B 8/02 600/443 |
| 8,115,846 B2 | | 2/2012 | Chuang et al. |
| 8,199,236 B2 | | 6/2012 | Karim et al. |
| 8,698,066 B2 | | 4/2014 | Sugita |
| 8,749,460 B2 | | 6/2014 | Akimoto et al. |
| 9,123,613 B2 | | 9/2015 | Brown et al. |
| 10,123,782 B2 | * | 11/2018 | Bhuyan .................... A61B 8/54 |

(Continued)

OTHER PUBLICATIONS

International Search Report and Written Opinion—PCT/US2018/048555—ISA/EPO—dated Mar. 14, 2019.

*Primary Examiner* — Ian J Lobo
(74) *Attorney, Agent, or Firm* — Weaver Austin Villeneuve & Sampson LLP

(57) ABSTRACT

This disclosure provides some examples of systems, apparatus, circuitry, methods and computer readable media associated with transmission of an ultrasonic signal using an ultrasonic transducer having a pixel electrode configured to receive a reflected acoustic signal having a first phase. A switch is controlled to: switch from off to on at a time of resetting a sampling node, be on for a delay period, and switch from on to off at a time of sampling the received signal to cause a sampled signal having a second phase different from the first phase to be detected. A first transistor, having a gate coupled with the sampling node, an input configured to receive a power signal, and an output coupled with a data line, is controlled to enable an output current to flow from the input to the output at a time of reading the sampled signal.

20 Claims, 11 Drawing Sheets

(56) References Cited

U.S. PATENT DOCUMENTS

| | | | |
|---|---|---|---|
| 2001/0013510 A1* | 8/2001 | Wiener-Avnear | ............................ H01L 27/14683 219/121.69 |
| 2016/0092716 A1* | 3/2016 | Yazdandoost | ........ G06K 9/0002 382/124 |
| 2017/0006245 A1 | 1/2017 | Akhavan et al. | |
| 2017/0059699 A1* | 3/2017 | Mathe | .................... A61B 5/117 |
| 2017/0090028 A1 | 3/2017 | Djordjev et al. | |

* cited by examiner

ULTRASONIC TRANSDUCER PIXEL READOUT CIRCUITRY AND METHODS FOR ULTRASONIC PHASE IMAGING

TECHNICAL FIELD

This disclosure relates to ultrasonic transducers and, in some implementations, to circuitry for an electronic sensor array or interactive display of piezoelectric transducers for biometric sensing, imaging, and touch or gesture recognition.

DESCRIPTION OF THE RELATED TECHNOLOGY

Ultrasonic sensor systems may use a transmitter to generate and send an ultrasonic wave through a transmissive medium and towards an object to be detected. The ultrasonic transmitter may be operatively coupled with an ultrasonic sensor array configured to detect portions of the ultrasonic wave that are reflected from the object. For example, in ultrasonic fingerprint sensors, an ultrasonic pulse may be produced by starting and stopping the transmitter during a short interval of time. At each material interface encountered by the ultrasonic pulse, a portion of the ultrasonic pulse may be reflected.

Piezoelectric ultrasonic transducers are attractive candidates for numerous applications such as biometric sensor systems including fingerprint sensors, gesture detection systems, microphones and speakers, ultrasonic imaging systems and chemical sensors. Such transducers can incorporate a piezoelectric material as a receiver for detecting ultrasonic signals. A piezoelectric ultrasonic transducer typically includes a piezoelectric stack suspended over a cavity. The piezoelectric stack may include a layer of piezoelectric material and a layer of patterned or unpatterned electrodes on each side of the piezoelectric layer.

SUMMARY

The systems, methods and devices of this disclosure each have several innovative aspects, no single one of which is solely responsible for the desirable attributes disclosed herein.

In some aspects, pixel circuitry of an ultrasonic sensor includes a pixel electrode, a switch and a first transistor. The pixel electrode is configured to receive an acoustic signal reflected from an object responsive to transmission of an ultrasonic signal associated with the ultrasonic sensor. The received signal has a first phase. The switch is configured to have an on state or an off state. The switch has: an output coupled with the pixel electrode to define a sampling node, and an input configured to receive a first row line signal. The first row line signal is configured to cause the switch to: switch from the off state to the on state at a time of resetting the sampling node, have the on state for a delay period following the transmission of the ultrasonic signal, and switch from the on state to the off state following the delay period at a time of sampling the received signal to cause a sampled signal having a second phase different from the first phase to be detected at the sampling node. The second phase is determined by the delay period. The first transistor has: a gate coupled with the sampling node, an input configured to receive a power signal, and an output coupled with a data line having a voltage different from a voltage of the power signal. The voltage differential is configured to enable an output current to flow from the input of the first transistor to the output of the first transistor at a time of reading the sampled signal. The output current can be modulated by the sampled signal.

In some implementations, the pixel circuitry further includes a second transistor configured to have an on state or an off state. The second transistor has: a gate configured to receive a second row line signal, an input coupled with the output of the first transistor, and an output coupled with the data line. The second row line signal is configured to cause the second transistor to switch from the off state to the on state to cause the output current to flow from the input of the first transistor to the output of the first transistor at the time of reading the sampled signal.

In some other implementations of the second transistor, the second transistor has: a gate configured to receive a control signal, an input configured to receive the power signal, and an output coupled with the input of the first transistor. The control signal is configured to cause the second transistor to switch from the off state to the on state to cause the power signal to be provided to the input of the first transistor at the time of reading the sampled signal.

In some implementations, a driver is coupled with the input of the switch to provide the first row line signal, and the driver is configured to control the first row line signal.

In some implementations, the first row line signal is further configured to cause the switch to provide a reset voltage to the sampling node at the time of resetting the sampling node. The reset voltage can be a bias voltage provided to a source or a drain of a transistor implementing the switch.

In some aspects, a method for ultrasonic phase imaging using pixel circuitry is provided. Operations of the method include: causing transmission of an ultrasonic signal using an ultrasonic transducer having a pixel electrode configured to receive an acoustic signal reflected from an object responsive to the transmission of the ultrasonic signal, where the received signal has a first phase; controlling a switch configured to have an on state or an off state to: switch from the off state to the on state at a time of resetting a sampling node at which the switch is coupled with the pixel electrode, have the on state for a delay period following the transmission of the ultrasonic signal, and switch from the on state to the off state following the delay period at a time of sampling the received signal to cause a sampled signal having a second phase different from the first phase to be detected at the sampling node, where the second phase is determined by the delay period; and controlling a first transistor having a gate coupled with the sampling node, an input configured to receive a power signal, and an output coupled with a data line having a voltage different from a voltage of the power signal, to enable an output current to flow from the input of the first transistor to the output of the first transistor at a time of reading the sampled signal.

In some implementations, the method can further include controlling a second transistor as described above to switch from the off state to the on state. In some implementations, the method can further include controlling the switch to provide the reset voltage to the sampling node at the time of resetting the sampling node, as described above.

In some aspects, a non-transitory computer readable medium storing program code to be executed by one or more processors is provided, where the program code includes instructions configured to cause performance of one or more of the operations of the methods described above.

BRIEF DESCRIPTION OF THE DRAWINGS

Details of one or more implementations of the subject matter described in this specification are set forth in the accompanying drawings and the description below. Other features, aspects and advantages will become apparent from the description, the drawings and the claims. Note that the relative dimensions of the drawings and other diagrams of this disclosure may not be drawn to scale. The sizes, thicknesses, arrangements, materials, etc., shown and described in this disclosure are made only by way of example and should not be construed as limiting Like reference numbers and designations in the various drawings indicate like elements.

DETAILED DESCRIPTION

Figure 1:
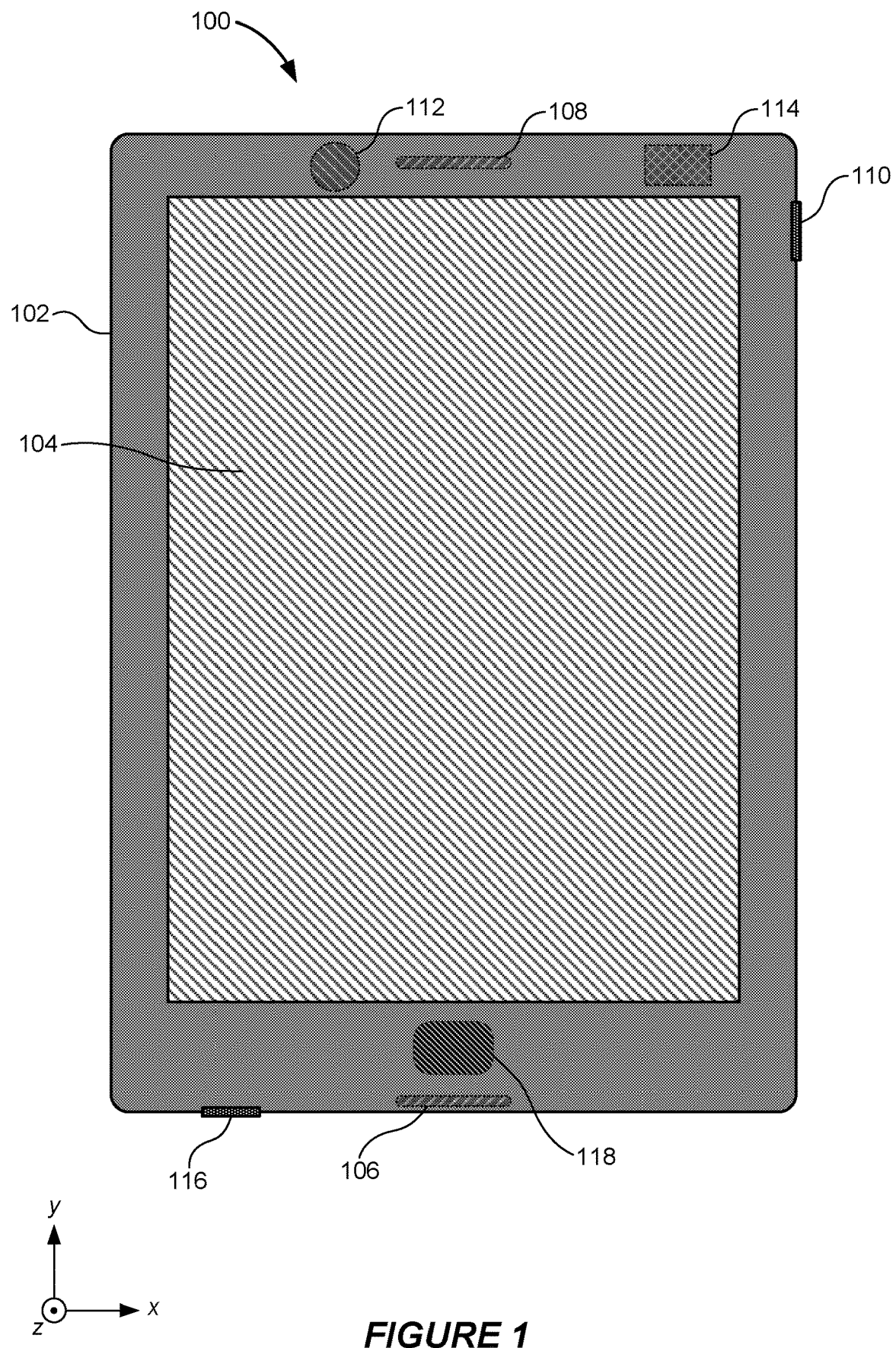
FIG. 1 shows a front view of a diagrammatic representation of an example of a mobile device 100 that includes an ultrasonic sensing system according to some implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system for ultrasonic sensing. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headband, patches, etc., Bluetooth® devices, personal data assistants (PDAs), wireless electronic mail receivers, hand-held or portable computers, netbooks, notebooks, smartbooks, tablet computers, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

By way of example, some fingerprint sensors may be implemented with an ultrasonic sensing system using piezoelectric material for the transmission and receiving of ultrasonic waves. For example, a voltage applied across piezoelectric material corresponding to a transmitter may result in the piezoelectric material stretching or contracting, e.g., being deformed such that the material is strained in response to the applied voltage, resulting in the generation of the ultrasonic wave, as previously discussed. The reflected signals (e.g., the reflected portions of the ultrasonic wave, as previously discussed) may result in the stretching or contracting of piezoelectric material corresponding to a receiver. This results in the generation of a surface charge, and therefore, a voltage across the piezoelectric material that may be used as an electrical output signal representing a portion of raw image data that represents fingerprint image data.

Some implementations of the subject matter described in this disclosure provide circuitry for an ultrasonic sensing system. In some implementations, different sub-circuits of panel circuitry of an M×N array of pixels, i.e., M rows by N columns of pixels, are provided in an ultrasonic sensing system. The sub-circuits include per-pixel readout circuitry, also referred to herein as pixel circuitry, as well as per-row driver circuitry and per-column multiplexing and biasing circuitry. In some implementations, pixels in a given row of an M×N array share one or more row lines for row line control of the pixel circuitry defining a pixel. In each pixel, a respective electrode receives an acoustic signal reflected from an object such as a finger in response to transmission of an ultrasonic signal. Each pixel also includes a respective switch having an output coupled with the electrode to define a sampling node. A control input of the switch is coupled with a row line, where a row line signal can be delivered to control the switch. In particular, the switch can be turned on to reset the sampling node and off to control sampling of a voltage at the sampling node. Thus, using the row line and row line signal, the switch can control both resetting and sampling.

In some implementations, pixel circuitry also includes a transistor configured as a source follower (SF) coupled with another transistor configured as a row select (RS) transistor. A second row line signal on a second row line can control switching of the RS transistor on or off. Switching the RS transistor on can cause an output current representing the sampled voltage to be delivered through the SF transistor and the RS transistor for reading the sampling node. In some other implementations, the RS transistor can be removed and the SF transistor driven for source addressing as opposed to gate addressing of the pixel circuitry. Some other implementations include controlling a data line voltage and/or other voltages connected to terminals of the pixel circuitry so only one pixel on a data line is turned on for reading while other pixels on the same data line are turned off. In some other implementations, a bias line otherwise used for delivering a voltage to the pixel circuitry can be de-coupled or altogether removed by controlling pixel resets using the data line.

Some implementations of the subject matter described in this disclosure may be practiced to realize one or more of the following potential advantages. Compared with some conventional pixel circuitry and panel configurations, some implementations of the disclosed pixel circuitry omit any diode which might be coupled in parallel with the switch, since the switch can control both resetting and sampling using row line control. In some implementations, the number of devices in the pixel circuitry and corresponding chip real estate can be reduced by including the switch and only one or two transistors versus four or more devices in conventional circuitry. In some implementations, when the bias line is omitted, the panel can be constructed with fewer vertical (column) control lines than conventional circuitry. In some implementations, a column of pixels can be driven with the same driver. In some implementations, row-level bias addressing is provided as opposed to pixel-level addressing. Additional potential advantages include improved pixel efficiency due to reduced parasitic capacitance associated with fewer on-pixel devices and fewer control lines, faster readout speeds due to smaller resistor-capacitor (RC) time constants associated with row-level addressing and column drivers, cleaner voltage sampling due to the omission of any diode from the pixel circuitry, and smaller on-panel integrated row drivers associated with use of row-level addressing.

FIG. 1 shows a front view of a diagrammatic representation of an example of a mobile device 100 that includes an ultrasonic sensing system according to some implementations. The mobile device 100 may be representative of, for example, various portable computing devices such as cellular phones, smartphones, multimedia devices, personal gaming devices, tablet computers and laptop computers, among other types of portable computing devices. However, various implementations described herein are not limited in application to portable computing devices. Indeed, various techniques and principles disclosed herein may be applied in traditionally non-portable devices and systems, such as in computer monitors, television displays, kiosks, vehicle navigation devices and audio systems, among other applications. Additionally, various implementations described herein are not limited in application to devices that include displays.

The mobile device 100 generally includes a housing (or "case") 102 within which various circuits, sensors and other electrical components reside. In the illustrated example implementation, the mobile device 100 also includes a touchscreen display (also referred to herein as a "touch-sensitive display") 104. The touchscreen display 104 generally includes a display and a touchscreen arranged over or otherwise incorporated into or integrated with the display. The display 104 may generally be representative of any of a variety of suitable display types that employ any of a variety of suitable display technologies. For example, the display 104 may be a digital micro-shutter (DMS)-based display, a light-emitting diode (LED) display, an organic LED (OLED) display, a liquid crystal display (LCD), an LCD display that uses LEDs as backlights, a plasma display, an interferometric modulator (IMOD)-based display, or another type of display suitable for use in conjunction with touch-sensitive user interface (UI) systems.

The mobile device 100 may include various other devices or components for interacting with, or otherwise communicating information to or receiving information from, a user. For example, the mobile device 100 may include one or more microphones 106, one or more speakers 108, and in some cases one or more at least partially mechanical buttons 110. The mobile device 100 may include various other components enabling additional features such as, for example, one or more video or still-image cameras 112, one or more wireless network interfaces 114 (for example, Bluetooth, WiFi or cellular) and one or more non-wireless interfaces 116 (for example, a universal serial bus (USB) interface or an HDMI interface).

The mobile device 100 may include an ultrasonic sensing system 118 capable of scanning and imaging an object signature, such as a fingerprint, palm print or handprint. In some implementations, the ultrasonic sensing system 118 may function as a touch-sensitive control button. In some implementations, a touch-sensitive control button may be implemented with a mechanical or electrical pressure-sensitive system that is positioned under or otherwise integrated with the ultrasonic sensing system 118. In other words, in some implementations, a region occupied by the ultrasonic sensing system 118 may function both as a user input button to control the mobile device 100 as well as a fingerprint sensor to enable security features such as user authentication features.

Figure 2A:
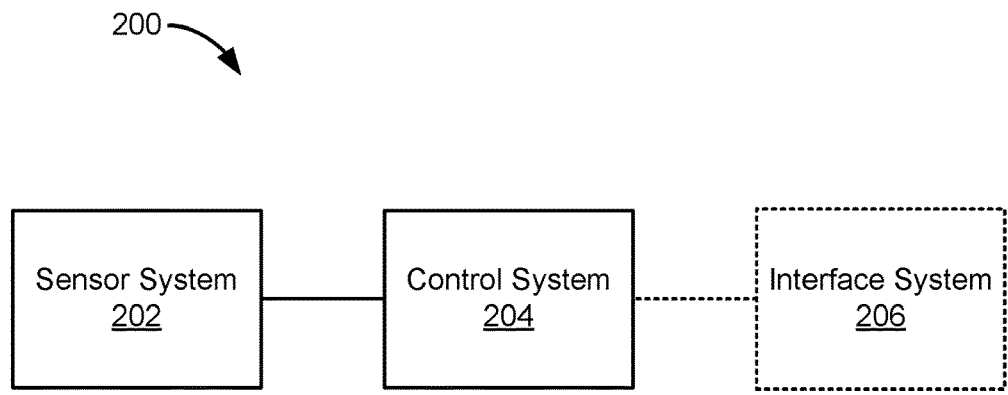
FIG. 2A shows a block diagram representation of components of an example of an ultrasonic sensing system 200 according to some implementations.

FIG. 2A shows a block diagram representation of components of an example of an ultrasonic sensing system 200 according to some implementations. As shown, the ultrasonic sensing system 200 may include a sensor system 202 and a control system 204 electrically coupled with the sensor system 202. The sensor system 202 may be capable of scanning an object and providing raw measured image data usable to obtain an object signature, for example, such as a fingerprint of a human finger. The control system 204 may be capable of controlling the sensor system 202 and processing the raw measured image data received from the sensor system. In some implementations, the ultrasonic sensing system 200 may include an interface system 206 capable of transmitting or receiving data, such as raw or processed measured image data, to or from various components within or integrated with the ultrasonic sensing system 200 or, in some implementations, to or from various components, devices or other systems external to the ultrasonic sensing system.

Figure 2B:
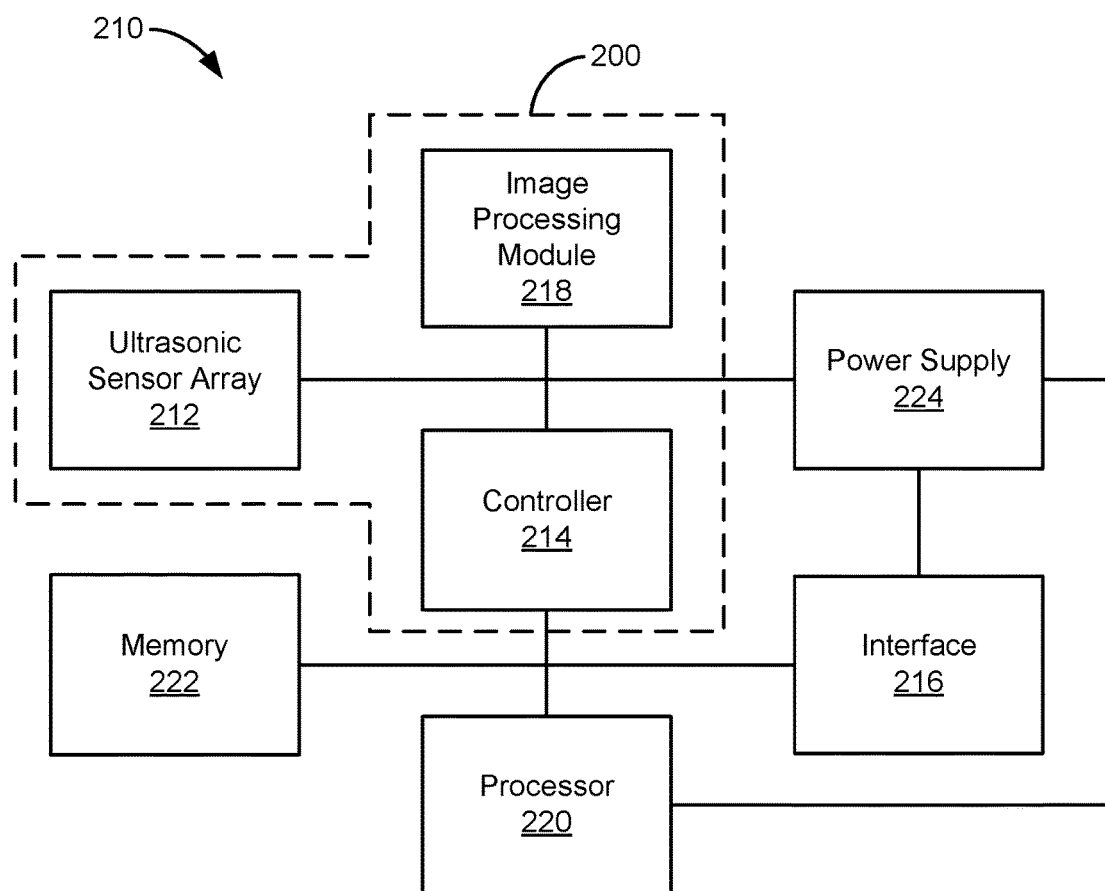
FIG. 2B shows a block diagram representation of components of an example of a mobile device 210 that includes the ultrasonic sensing system of FIG. 2A.

FIG. 2B shows a block diagram representation of components of an example of a mobile device 210 that includes the ultrasonic sensing system 200 of FIG. 2A. For example, the mobile device 210 may be a block diagram representation of the mobile device 100 shown in and described with reference to FIG. 1 above. The sensor system 202 of the ultrasonic sensing system 200 of the mobile device 210 may be implemented with an ultrasonic sensor array 212. The control system 204 of the ultrasonic sensing system 200 may be implemented with a controller 214 that is electrically coupled with the ultrasonic sensor array 212. While the controller 214 is shown and described as a single component, in some implementations, the controller 214 may collectively refer to two or more distinct control units or processing units in electrical communication with one another. In some implementations, the controller 214 may include one or more of a general purpose single- or multi-chip processor, a central processing unit (CPU), a digital signal processor (DSP), an applications processor, an application specific integrated circuit (ASIC), a field programmable gate array (FPGA) or other programmable logic device (PLD), discrete gate or transistor logic, discrete hardware components, or any combination thereof designed to perform the functions and operations described herein.

The ultrasonic sensing system 200 of FIG. 2B may include an image processing module 218. In some implementations, raw measured image data provided by the ultrasonic sensor array 212 may be sent, transmitted, communicated or otherwise provided to the image processing module 218. The image processing module 218 may include any suitable combination of hardware, firmware and software configured, adapted or otherwise operable to process the image data provided by the ultrasonic sensor array 212. In some implementations, the image processing module 218 may include signal or image processing circuits or circuit components including, for example, amplifiers (such as instrumentation amplifiers or buffer amplifiers), analog or digital mixers or multipliers, switches, analog-to-digital converters (ADCs), passive or active analog filters, among others. In some implementations, one or more of such circuits or circuit components may be integrated within the controller 214, for example, where the controller 214 is implemented as a system-on-chip (SoC) or system-in-package (SIP). In some implementations, one or more of such circuits or circuit components may be integrated within a DSP included within or coupled with the controller 214. In some implementations, the image processing module 218 may be implemented at least partially via software. For example, one or more functions of, or operations performed by, one or more of the circuits or circuit components just described may instead be performed by one or more software modules executing, for example, in a processing unit of the controller 214 (such as in a general purpose processor or a DSP).

In some implementations, in addition to the ultrasonic sensing system 200, the mobile device 210 may include a separate processor 220, a memory 222, an interface 216 and a power supply 224. In some implementations, the controller 214 of the ultrasonic sensing system 200 may control the ultrasonic sensor array 212 and the image processing module 218, and the processor 220 of the mobile device 210 may control other components of the mobile device 210. In some implementations, the processor 220 communicates data to the controller 214 including, for example, instructions or commands. In some such implementations, the controller 214 may communicate data to the processor 220 including, for example, raw or processed image data. It should also be understood that, in some other implementations, the functionality of the controller 214 may be implemented entirely, or at least partially, by the processor 220. In some such implementations, a separate controller 214 for the ultrasonic sensing system 200 may not be required because the functions of the controller 214 may be performed by the processor 220 of the mobile device 210.

Depending on the implementation, one or both of the controller 214 and processor 220 may store data in the memory 222. For example, the data stored in the memory 222 may include raw measured image data, filtered or otherwise processed image data, estimated PSF or estimated image data, and final refined PSF or final refined image data. The memory 222 may store processor-executable code or other executable computer-readable instructions capable of execution by one or both of the controller 214 and the processor 220 to perform various operations (or to cause other components such as the ultrasonic sensor array 212, the image processing module 218, or other modules to perform operations), including any of the calculations, computations, estimations or other determinations described herein (including those presented in any of the equations below). It should also be understood that the memory 222 may collectively refer to one or more memory devices (or "components"). For example, depending on the implementation, the controller 214 may have access to and store data in a different memory device than the processor 220. In some implementations, one or more of the memory components may be implemented as a NOR- or NAND-based Flash memory array. In some other implementations, one or more of the memory components may be implemented as a different type of non-volatile memory. Additionally, in some implementations, one or more of the memory components may include a volatile memory array such as, for example, a type of RAM.

In some implementations, the controller 214 or the processor 220 may communicate data stored in the memory 222 or data received directly from the image processing module 218 through an interface 216. For example, such communicated data can include image data or data derived or otherwise determined from image data. The interface 216 may collectively refer to one or more interfaces of one or more various types. In some implementations, the interface 216 may include a memory interface for receiving data from or storing data to an external memory such as a removable memory device. Additionally or alternatively, the interface 216 may include one or more wireless network interfaces or one or more wired network interfaces enabling the transfer of raw or processed data to, as well as the reception of data from, an external computing device, system or server.

A power supply 224 may provide power to some or all of the components in the mobile device 210. The power supply 224 may include one or more of a variety of energy storage devices. For example, the power supply 224 may include a rechargeable battery, such as a nickel-cadmium battery or a lithium-ion battery. Additionally or alternatively, the power supply 224 may include one or more supercapacitors. In some implementations, the power supply 224 may be chargeable (or "rechargeable") using power accessed from, for example, a wall socket (or "outlet") or a photovoltaic device (or "solar cell" or "solar cell array") integrated with the mobile device 210. Additionally or alternatively, the power supply 224 may be wirelessly chargeable.

As used hereinafter, the term "processing unit" refers to any combination of one or more of a controller of an ultrasonic system (for example, the controller 214), an image processing module (for example, the image processing module 218), or a separate processor of a device that includes the ultrasonic system (for example, the processor 220). In other words, operations that are described below as being performed by or using a processing unit may be performed by one or more of a controller of the ultrasonic system, an image processing module, or a separate processor of a device that includes the ultrasonic sensing system.

Figure 3A:
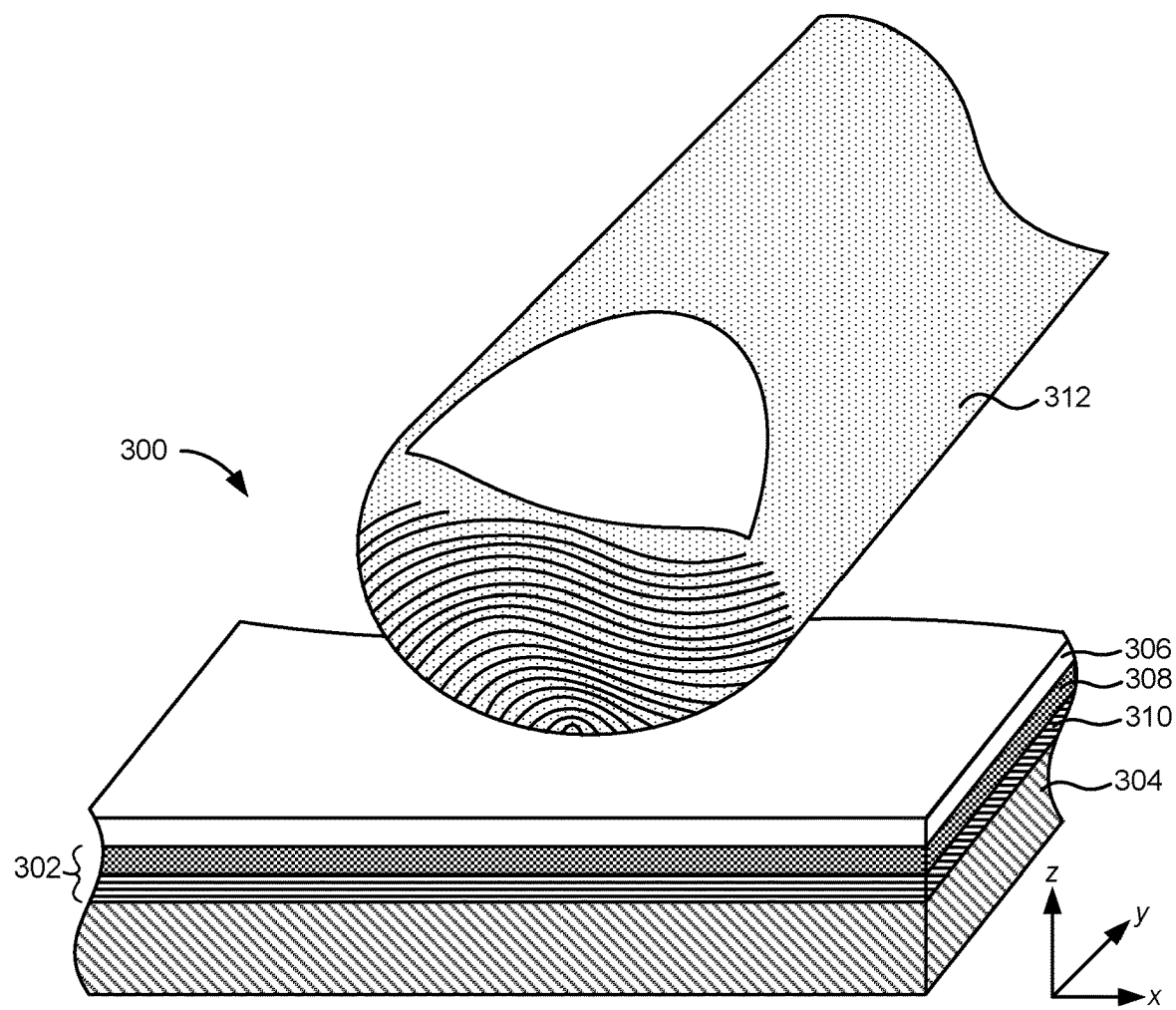
FIG. 3A shows a cross-sectional projection view of a diagrammatic representation of a portion of an example of an ultrasonic sensing system 300 according to some implementations.
Figure 3B:
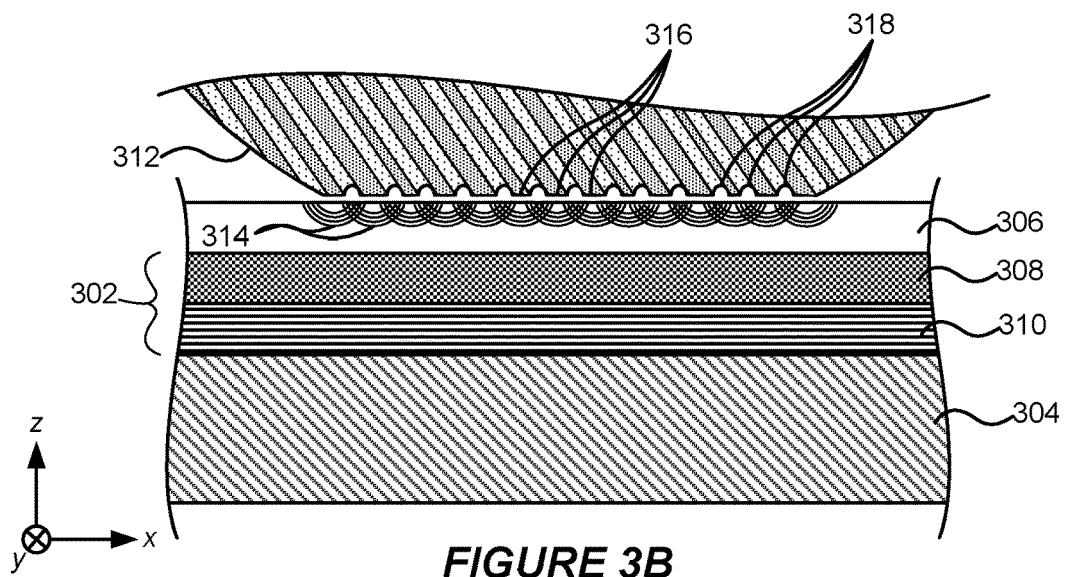
FIG. 3B shows a zoomed-in cross-sectional side view of the ultrasonic sensing system of FIG. 3A according to some implementations.

FIG. 3A shows a cross-sectional projection view of a diagrammatic representation of a portion of an example of an ultrasonic sensing system 300 according to some implementations. FIG. 3B shows a zoomed-in cross-sectional side view of the ultrasonic sensing system of FIG. 3A according to some implementations. For example, the ultrasonic sensing system 300 may implement the ultrasonic sensing system 118 described with reference to FIG. 1 or the ultrasonic sensing system 200 shown and described with reference to FIGS. 2A and 2B. The ultrasonic sensing system 300 may include an ultrasonic transducer 302 that overlies a substrate 304 and that underlies a platen (a "cover plate" or "cover glass") 306. The ultrasonic transducer 302 may include both an ultrasonic transmitter 308 and an ultrasonic receiver 310.

The ultrasonic transmitter 308 is generally configured to generate ultrasonic waves towards the platen 306, and in the illustrated implementation, towards a human finger positioned on the upper surface of the platen. In some implementations, the ultrasonic transmitter 308 may more specifically be configured to generate ultrasonic plane waves towards the platen 306. In some implementations, the ultrasonic transmitter 308 includes a layer of piezoelectric material such as, for example, polyvinylidene fluoride (PVDF) or a PVDF copolymer such as PVDF-TrFE. For example, the piezoelectric material of the ultrasonic transmitter 308 may be configured to convert electrical signals provided by the controller of the ultrasonic sensing system into a continuous or pulsed sequence of ultrasonic plane waves at a scanning frequency. In some implementations, the ultrasonic transmitter 308 may additionally or alternatively include capacitive ultrasonic devices.

Figure 4:
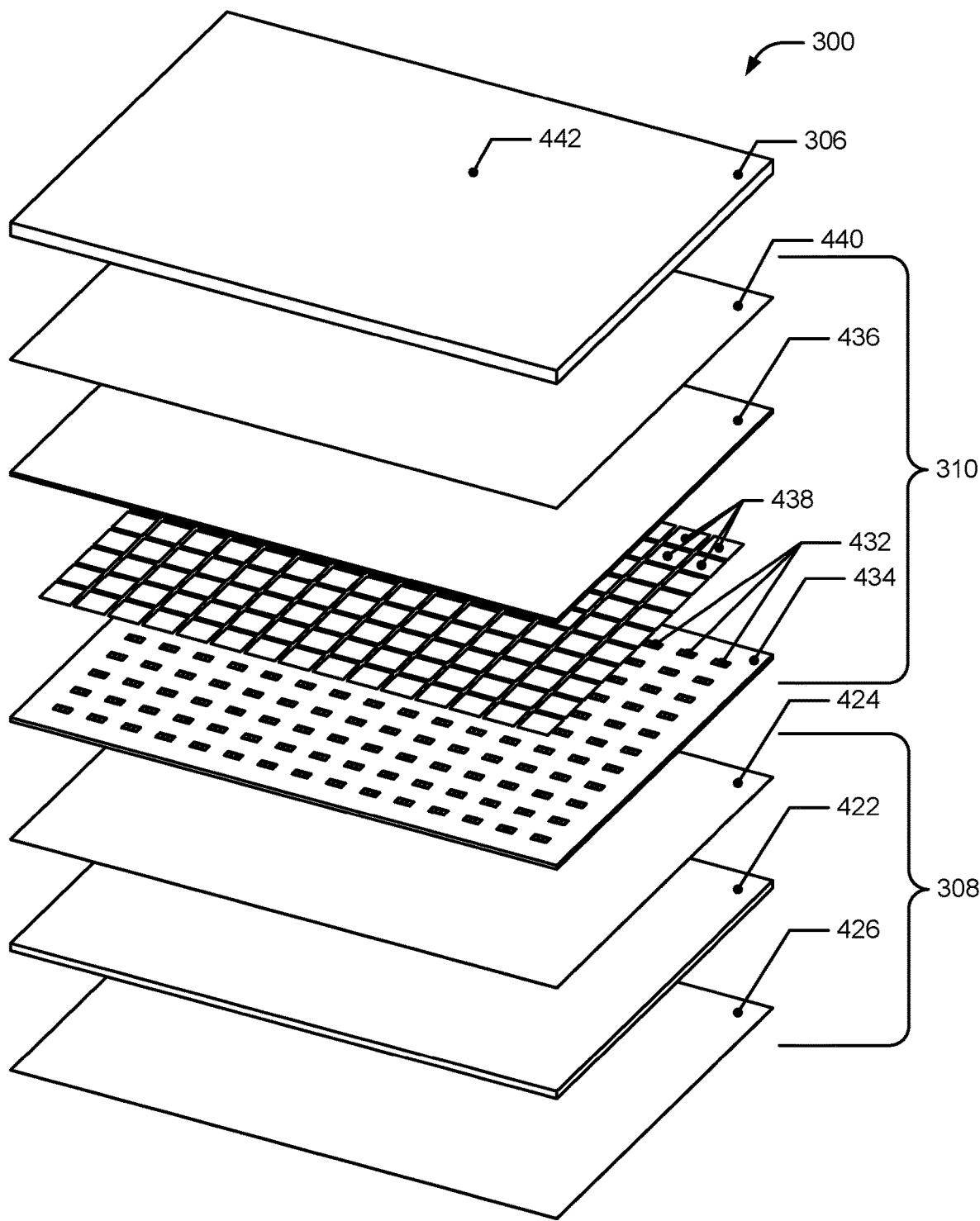
FIG. 4 shows an exploded projection view of an example of components of the ultrasonic sensing system of FIGS. 3A and 3B according to some implementations.

The ultrasonic receiver 310 is generally configured to detect ultrasonic reflections 314 resulting from interactions of the ultrasonic waves transmitted by the ultrasonic transmitter 308 with ridges 316 and valleys 318 defining the fingerprint of the finger 312 being scanned. In some implementations, the ultrasonic transmitter 308 overlies the ultrasonic receiver 310 as, for example, illustrated in FIGS. 3A and 3B. In some other implementations, the ultrasonic receiver 310 may overlie the ultrasonic transmitter 308 (as shown in FIG. 4 described below). The ultrasonic receiver 310 may be configured to generate and output electrical output signals corresponding to the detected ultrasonic reflections. In some implementations, the ultrasonic receiver 310 may include a second piezoelectric layer different than the piezoelectric layer of the ultrasonic transmitter 308. For example, the piezoelectric material of the ultrasonic receiver 310 may be any suitable piezoelectric material such as, for example, a layer of PVDF or a PVDF copolymer. The piezoelectric layer of the ultrasonic receiver 310 may convert vibrations caused by the ultrasonic reflections into electrical output signals. In some implementations, the ultrasonic receiver 310 further includes a thin-film transistor (TFT) layer. In some such implementations, the TFT layer may include an array of sensor pixel circuits configured to amplify the electrical output signals generated by the piezoelectric layer of the ultrasonic receiver 310. The amplified electrical signals provided by the array of sensor pixel circuits may then be provided as raw measured image data to the processing unit for use in processing the image data, identifying a fingerprint associated with the image data, and in some applications, authenticating a user associated with the fingerprint. In some implementations, a single piezoelectric layer may serve as the ultrasonic transmitter 308 and the ultrasonic receiver 310. In some implementations, the substrate 304 may be a glass, plastic or silicon substrate upon which electronic circuitry may be fabricated. In some implementations, an array of sensor pixel circuits and associated interface circuitry of the ultrasonic receiver 310 may be configured from CMOS circuitry formed in or on the substrate 304. In some implementations, the substrate 304 may be positioned between the platen 306 and the ultrasonic transmitter 308 and/or the ultrasonic receiver 310. In some implementations, the substrate 304 may serve as the platen 306. One or more protective layers, acoustic matching layers, anti-smudge layers, adhesive layers, decorative layers, conductive layers or other coating layers (not shown) may be included on one or more sides of the substrate 304 and the platen 306.

The platen 306 may be formed of any suitable material that may be acoustically coupled with the ultrasonic transmitter 308. For example, the platen 306 may be formed of one or more of glass, plastic, ceramic, sapphire, metal or metal alloy. In some implementations, the platen 306 may be a cover plate such as, for example, a cover glass or a lens glass of an underlying display. In some implementations, the platen 306 may include one or more polymers, such as one or more types of parylene, and may be substantially thinner. In some implementations, the platen 306 may have a thickness in the range of about 10 microns ($\mu m$) to about 1000 $\mu m$ or more.

In some implementations, the ultrasonic sensing system 300 may further include a focusing layer (not shown). For example, the focusing layer may be positioned above the ultrasonic transmitter 308. The focusing layer may generally include one or more acoustic lenses capable of altering the paths of ultrasonic waves transmitted by the ultrasonic transmitter 308. In some implementations, the lenses may be implemented as cylindrical lenses, spherical lenses or zone lenses. In some implementations, some or all of the lenses may be concave lenses, whereas in some other implementations some or all of the lenses may be convex lenses, or include a combination of concave and convex lenses.

In some implementations that include such a focusing layer, the ultrasonic sensing device 300 may additionally include an acoustic matching layer to ensure proper acoustic coupling between the focusing lens(es) and an object, such as a finger, positioned on the platen 306. For example, the acoustic matching layer may include an epoxy doped with particles that change the density of the acoustic matching layer. If the density of the acoustic matching layer is changed, then the acoustic impedance will also change according to the change in density, if the acoustic velocity remains constant. In alternative implementations, the acoustic matching layer may include silicone rubber doped with metal or with ceramic powder. In some implementations, sampling strategies for processing output signals may be implemented that take advantage of ultrasonic reflections being received through a lens of the focusing layer. For example, an ultrasonic wave coming back from a lens' focal point will travel into the lens and may propagate towards multiple receiver elements in a receiver array fulfilling the acoustic reciprocity principle. Depending on the signal strength coming back from the scattered field, an adjustment of the number of active receiver elements is possible. In general, the more receiver elements that are activated to receive the returned ultrasonic waves, the higher the signalto-noise ratio (SNR). In some implementations, one or more acoustic matching layers may be positioned on one or both sides of the platen 306, with or without a focusing layer.

FIG. 4 shows an exploded projection view of an example of components of the example ultrasonic sensing system of FIGS. 3A and 3B according to some implementations. The ultrasonic transmitter 308 may include a substantially planar piezoelectric transmitter layer 422 capable of functioning as a plane wave generator. Ultrasonic waves may be generated by applying a voltage across the piezoelectric transmitter layer 422 to expand or contract the layer, depending upon the voltage signal applied, thereby generating a plane wave. In this example, the processing unit (not shown) is capable of causing a transmitter excitation voltage to be applied across the piezoelectric transmitter layer 422 via a first transmitter electrode 424 and a second transmitter electrode 426. The first and second transmitter electrodes 424 and 426 may be metallized electrodes, for example, metal layers that coat opposing sides of the piezoelectric transmitter layer 422. As a result of the piezoelectric effect, the applied transmitter excitation voltage causes changes in the thickness of the piezoelectric transmitter layer 422, and in such a fashion, generates ultrasonic waves at the frequency of the transmitter excitation voltage.

The ultrasonic waves may travel towards a target object, such as a finger, passing through the platen 306. A portion of the ultrasonic waves not absorbed or transmitted by the target object may be reflected back through the platen 306 and received by the ultrasonic receiver 310, which, in the implementation illustrated in FIG. 4, overlies the ultrasonic transmitter 308. The ultrasonic receiver 310 may include an array of sensor pixel circuits 432 disposed on a substrate 434 and a piezoelectric receiver layer 436. In some implementations, each sensor pixel circuit 432 may include one or more TFT or CMOS transistor elements, electrical interconnect traces and, in some implementations, one or more additional circuit elements such as diodes, capacitors, and the like. Each sensor pixel circuit 432 may be configured to convert an electric charge generated in the piezoelectric receiver layer 436 proximate to the pixel circuit into an electrical signal. Each sensor pixel circuit 432 may include a pixel input electrode 438 that electrically couples the piezoelectric receiver layer 436 to the sensor pixel circuit 432.

In the illustrated implementation, a receiver bias electrode 440 is disposed on a side of the piezoelectric receiver layer 436 proximal to the platen 306. The receiver bias electrode 440 may be a metallized electrode and may be grounded or biased to control which signals may be passed to the array of sensor pixel circuits 432. Ultrasonic energy that is reflected from the exposed (upper/top) surface 442 of the platen 306 may be converted into localized electrical charges by the piezoelectric receiver layer 436. These localized charges may be collected by the pixel input electrodes 438 and passed on to the underlying sensor pixel circuits 432. The charges may be amplified or buffered by the sensor pixel circuits 432 and provided to the processing unit. The processing unit may be electrically connected (directly or indirectly) with the first transmitter electrode 424 and the second transmitter electrode 426, as well as with the receiver bias electrode 440 and the sensor pixel circuits 432 on the substrate 434. In some implementations, the processing unit may operate substantially as described above. For example, the processing unit may be capable of processing the signals received from the sensor pixel circuits 432.

Some examples of suitable piezoelectric materials that can be used to form the piezoelectric transmitter layer 422 or the piezoelectric receiver layer 436 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be utilized include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 422 and the piezoelectric receiver layer 436 is selected so as to be suitable for generating and receiving ultrasonic waves, respectively. In one example, a PVDF piezoelectric transmitter layer 422 is approximately 28 μm thick and a PVDF-TrFE receiver layer 436 is approximately 12 μm thick. Example frequencies of the ultrasonic waves may be in the range of about 1 Megahertz (MHz) to about 100 MHz, with wavelengths on the order of a millimeter or less.

Figure 5:
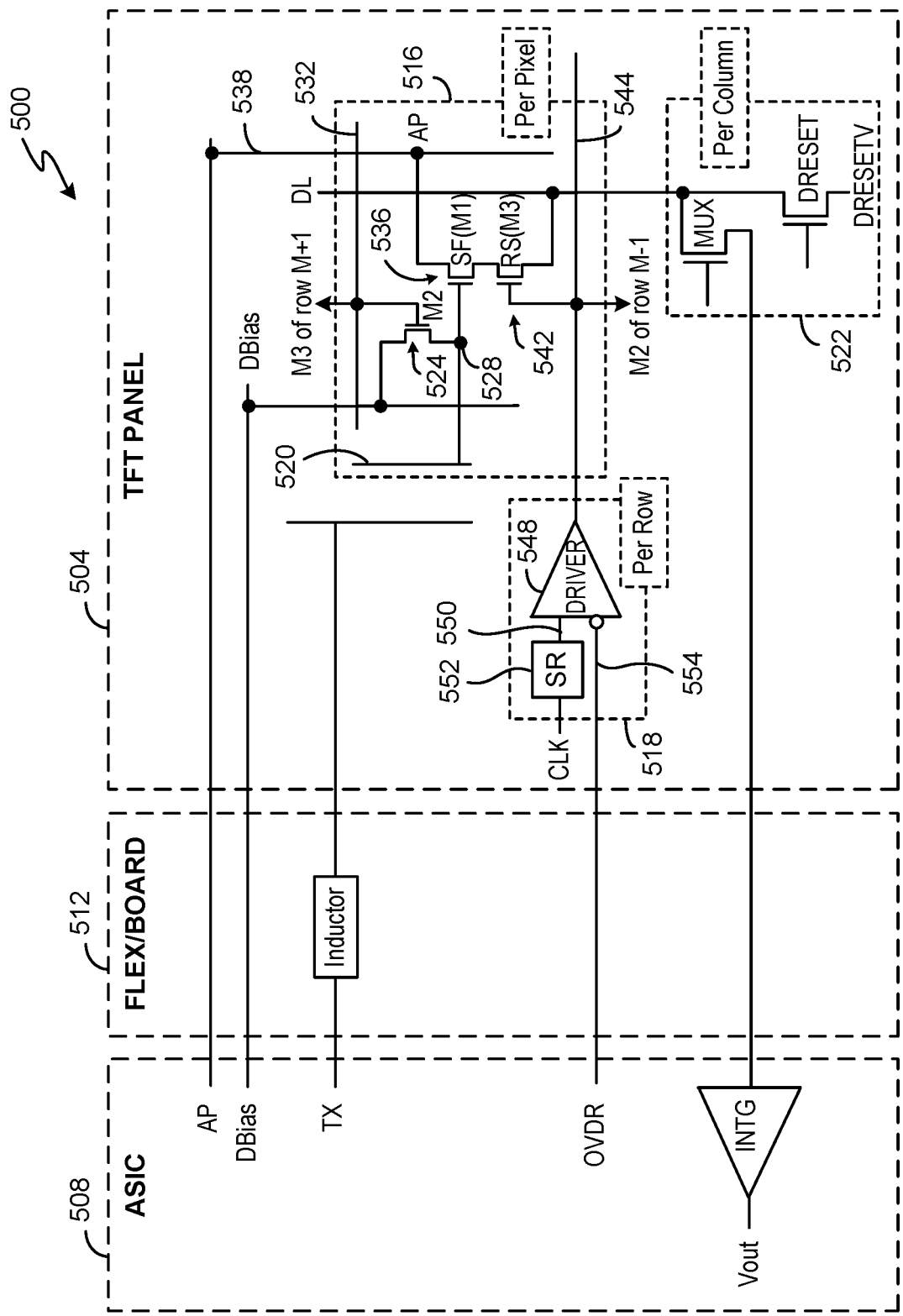
FIG. 5 shows a circuit diagram of an example of a circuit 500 for an ultrasonic sensing system according to some implementations.

FIG. 5 shows a circuit diagram of an example of a circuit 500 for an ultrasonic sensing system according to some implementations. In this example, circuit 500 includes a TFT panel 504 in electrical communication with an ASIC 508 through a flex/board 512. In some implementations, TFT panel 504 and ASIC 508 are separate components, for instance, where TFT panel 504 is implemented on a sensor chip manufactured at one geographic location, and ASIC 508 is manufactured at another and later combined in circuit 500. In FIG. 5, dashed boxes inside TFT panel 504 indicate at least three TFT panel sub-circuits, which each sub-circuit is labeled to indicate whether the sub-circuit is per-pixel, per-row or per-column in an M×N array of pixels. In particular, TFT panel 504 incorporates per-pixel readout circuitry 516, also referred to herein as pixel circuitry 516, as well as per-row driver circuitry 518 and per-column multiplexing and biasing circuitry 522.

Referring to pixel circuitry 516 as "per-pixel" indicates that TFT panel 504 of FIG. 5 is simplified for purposes of illustration to show only one set of pixel circuitry 516 corresponding to a single pixel. In practice, TFT panel 504 is constructed to include M rows by N columns of pixels, where each pixel has respective pixel circuitry 516, as illustrated in the arrangement of sensor pixel circuit array 432 on substrate 434 of FIG. 4. In the example of FIG. 5, all of the pixels in a given row (M) of the array share at least two row lines 532 and 544, described in greater detail below. In FIG. 5, all of the pixels in a given column (N) of the array can be coupled with at least two column lines, DBias providing a bias signal and AP providing a power signal, also described in greater detail below. In some other implementations, the DBias line can be entirely omitted. In FIG. 5, each pixel in the array has a data line (DL), which generally carries a signal out of the pixel for reading.

Figure 7:
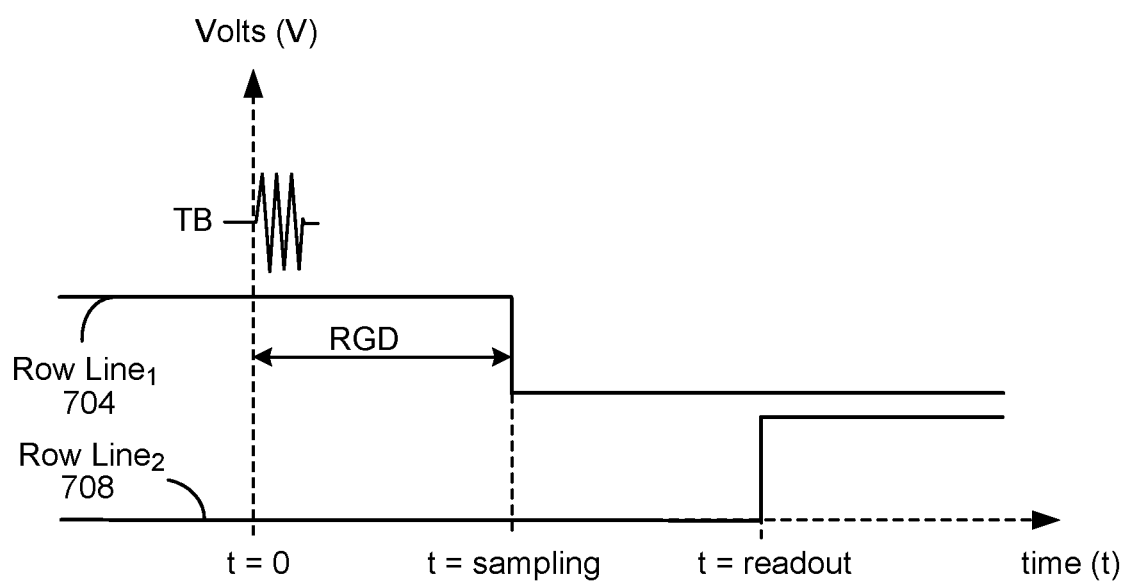
FIG. 7 shows a timing diagram of examples of row line signal waveforms for controlling pixel sampling and readout according to some implementations.

In FIG. 5, a pixel electrode 520 of pixel circuitry 516 can be made of a copolymer material and is situated to receive an acoustic signal reflected from an object such as a finger in responsive to transmission of an ultrasonic signal, as described above. A switch 524 implemented as a transistor (M2) in this example has an on state or an off state at any given time. Switch 524 has an output coupled with pixel electrode 520 to define a sampling node 528. Switch 524 has a current input coupled with DBias and a control input, the gate of transistor M2 in this example, coupled with first row line 532, where a first row line signal is provided. The first row line signal has a waveform configured to cause switch 524 to switch from off to on at a time when it is desired to reset sampling node 528. The waveform of the first row line signal, described in greater detail below with reference to FIG. 7, is configured to cause switch 524 to maintain the on state for a delay period following the transmission of the ultrasonic signal. The waveform of the first row line signal is also configured to cause switch 524 to switch from on to off following the delay period at a time when it is desired to sample the received acoustic signal. The switching of switch 524 from on to off causes a voltage signal to be detected at sampling node 528, and that voltage signal is generally referred to herein as the sampled signal. Thus, in the example of FIG. 5, switch 524 enables both resetting and sampling.

In FIG. 5, a transistor 536 (M1) implemented as a source follower (SF) has a gate coupled with sampling node 528, a current input coupled with a column line 538 providing a power signal (AP), and an output coupled with a current input of a row select (RS) transistor 542 (M3). In the example of FIG. 5, the transistor implementing switch 524 and transistors 536 and 542 are n-channel MOSFETS, also referred to as NMOS transistors.

RS transistor 542 has a gate coupled with second row line 544, where a second row line signal is provided. The second row line signal is configured to cause RS transistor 542 to switch on or off. RS transistor 542 has an output coupled with a data line (DL), which generally has a voltage different from a voltage of AP. For instance, AP can be an available power supply voltage such as 10 volts (V) coupled with the drain of SF transistor 536, while DL can be a relatively lower voltage such as 5 V. When the second row line signal causes RS transistor 542 to switch from off to on, the source of SF transistor 536 can deliver an output current (Iout) through RS transistor 542 to DL. In particular, the difference in voltage between AP and DL enables Iout to flow through transistors 536 and 542 at a time when it is desired to read the sampled signal from sampling node 528. Iout is modulated by the sampled signal; for example, a larger voltage of the sampled signal yields a larger Iout.

In FIG. 5, driver circuitry 518 of TFT panel 504 includes a driver 548 having an output coupled with second row line 544 to drive the second row line signal. While not shown in FIG. 5, driver 548 and additional circuitry, or another driver, can similarly have an output coupled with first row line 532 to drive the first row line signal. In the example of FIG. 5, a first input 550 of driver 548 is coupled with a set-reset (SR) latch 552 to receive a latched clock signal (CLK). A second inverting input 554 of driver 548 receives a drive signal (OVDR) from ASIC 508. OVDR can control a row line signal.

In FIG. 5, pixel circuitry 516 is configured to provide phase imaging in which pixel circuitry 516 is generally driven in a manner to sample a voltage at sampling node 528 in a particular phase of a signal. In the example of FIG. 5, as explained in greater detail herein, phase imaging is performed by varying the on time of switch 524.

Figure 6:
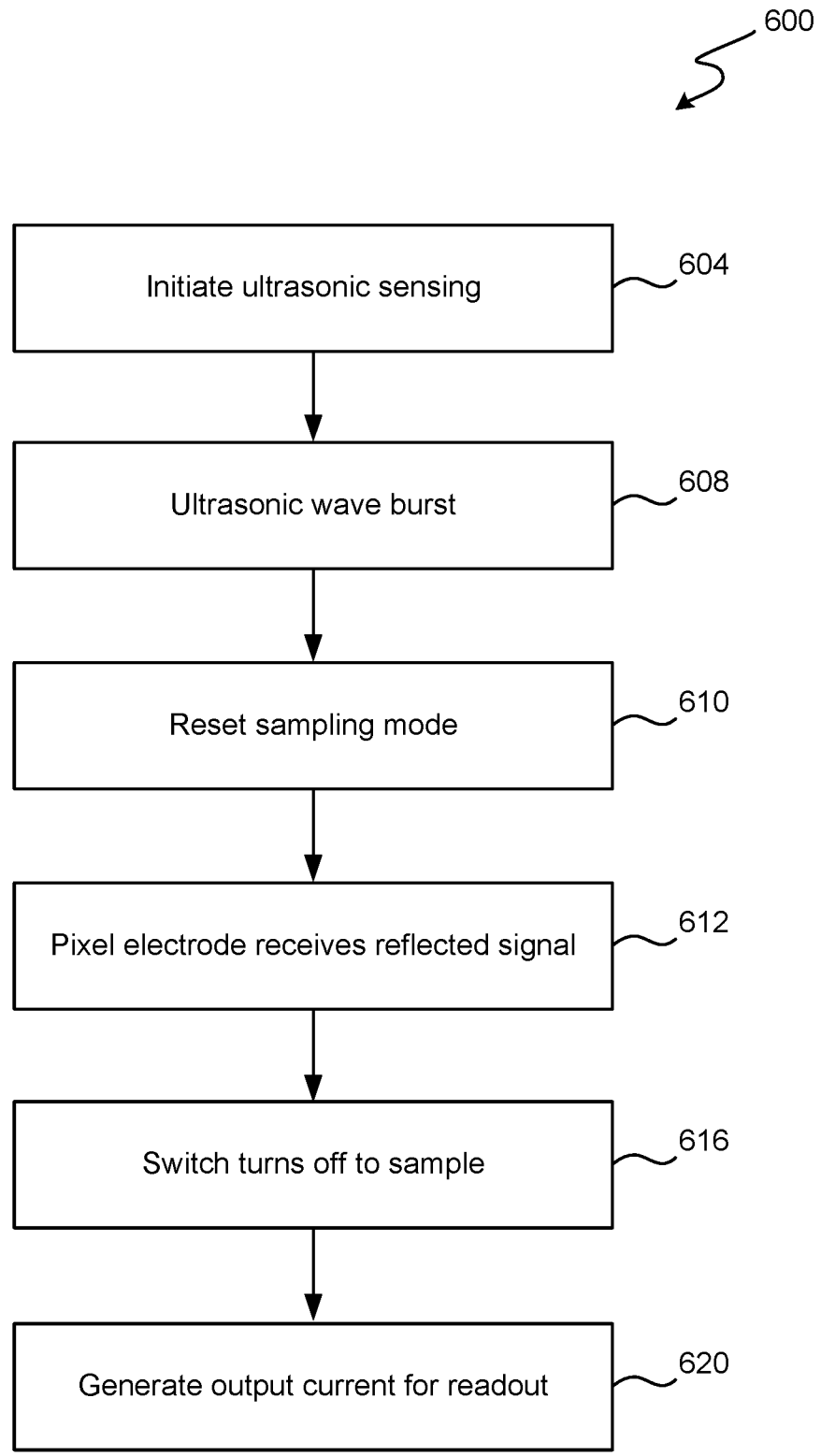
FIG. 6 shows a flow diagram of an example of a method 600 for ultrasonic sensing according to some implementations.

FIG. 6 shows a flow diagram of an example of a method 600 for ultrasonic sensing according to some implementations. One or more operations of the method 600 may be initiated by one or more of the controllers described above. At 604 of FIG. 6, an ultrasonic sensing operation is initiated. For example, returning to FIG. 2B, controller 214 may receive a command from processor 220 indicating that controller 214 is to initiate the ultrasonic sensing operation. At 608 of FIG. 6, a transmission control signal is provided to the ultrasonic sensor or an entire ultrasonic sensor array 212 of FIG. 2B. This transmission control signal can be generated using a resonator circuit in some implementations. For instance, the transmission control signal can be in the form of a burst signal provided to a transmitter of the ultrasonic transducer to initiate generation of a main burst of the ultrasonic wave. As shown in FIG. 7, which shows a timing diagram of examples of row line signal waveforms for controlling pixel sampling and readout according to some implementations, the burst occurs at time t=0.

Returning to FIG. 6, at 610, switch 524 of FIG. 5 is controlled by the first row line signal to switch from off to on to reset sampling node 528. For example, in FIG. 5, a reset voltage is applied to sampling node 528 by providing DBias to a source or drain of the transistor implementing switch 524, to reset the pixel. For instance, DBias and the reset voltage can be about 5 V. Returning to FIG. 6, those skilled in the art should appreciate that 610 can occur before, after or simultaneous with 608. At 612, pixel electrode 520 of FIG. 5 receives an acoustic signal reflected back from an object such as a finger. As shown in FIG. 7, first row line signal 704 maintains switch 524 in the on state for a range gate delay (RGD) starting at t=0. At 616 of FIG. 6, first row line signal 704 of FIG. 7 goes from a relatively high to a relatively low voltage to cause switch 524 to switch from on to off following RGD when it is desired to sample the received signal, at time t=sampling. This isolates the gate of SF transistor 536 from any bias voltage to cause the sampled signal to be detected at sampling node 528 of FIG. 5. Phase imaging is achieved by controlling RGD. Because of RGD as a control parameter, the sampled signal can be out of phase with the receive signal at pixel electrode 520. The particular phase of the sampled signal can be controlled by adjusting RGD. Also, RGD can be adjusted to affect image clarity of the received signal. RGD can be determined and optimized through experimentation.

In FIG. 6, at 620, readout occurs when second row line signal 708 as shown in FIG. 7 goes from low to high at time t=readout to cause RS transistor 542 of FIG. 5 to switch from off to on, as mentioned above. The difference in voltage between AP and DL enables Tout to flow to DL, as described above with reference to FIG. 5.

Figure 8:
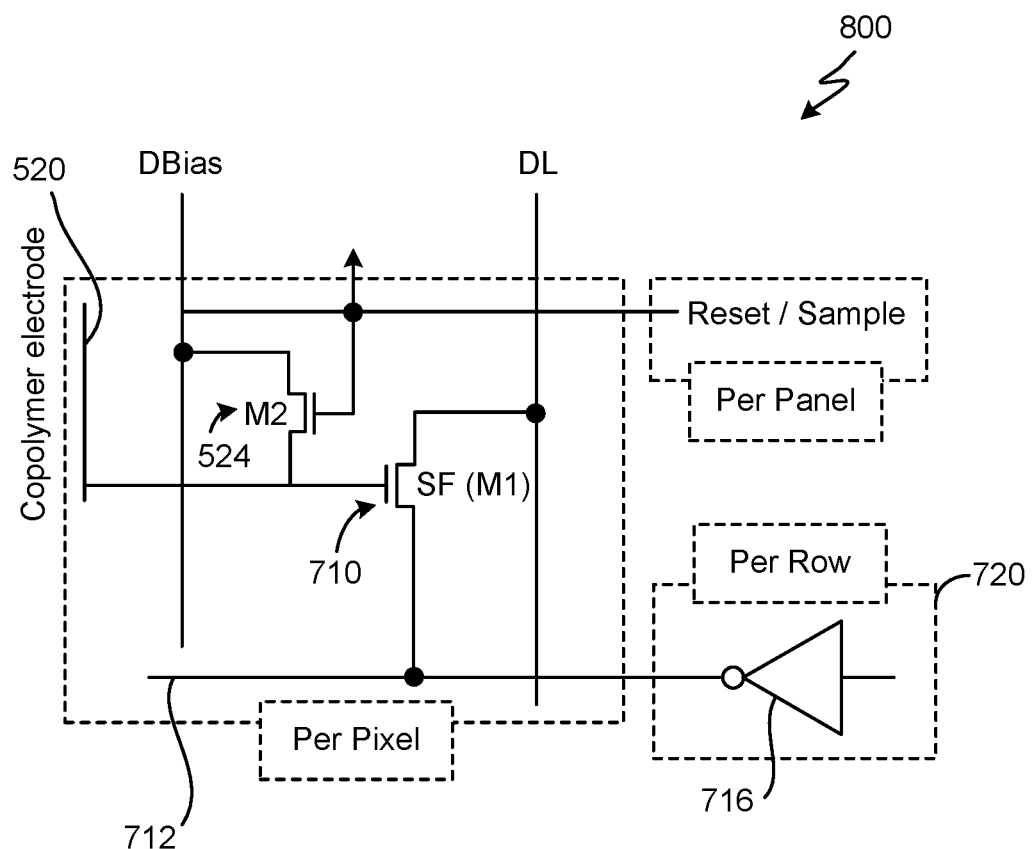
FIG. 8 shows a circuit diagram of an example of a circuit 800 for an ultrasonic sensing system in which a row select transistor of pixel circuitry is removed according to some implementations.

FIG. 8 shows a circuit diagram of an example of a circuit 800 for an ultrasonic sensing system in which a row select transistor of pixel circuitry is removed according to some implementations. In the alternative configuration of FIG. 8, RS transistor 542 of FIG. 5 has been removed, and an SF transistor 710 has different interconnections than SF transistor 536 of FIG. 5. In FIG. 8, source addressing of a pixel in a pixel array is implemented as opposed to the gate addressing of FIG. 5. To this end, the source of SF transistor 710 is coupled with DL, and the drain of SF transistor 710 is coupled with a row line 712. Since RS transistor 542 has been removed, an inverting diode 716 can be provided in per-row circuitry 720 to drive a row line signal on row line 712.

Figure 9:
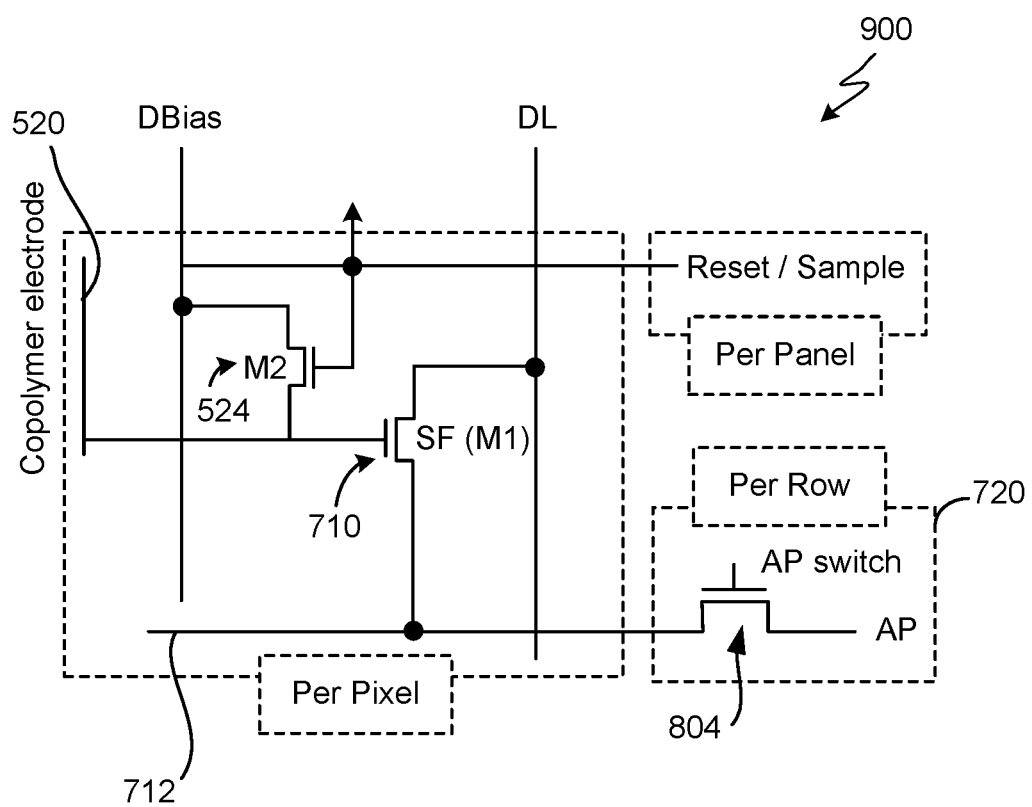
FIG. 9 shows a circuit diagram of another example of a circuit 900 for an ultrasonic sensing system in which a row select transistor of pixel circuitry is removed according to some implementations.

FIG. 9 shows a circuit diagram of another example of a circuit 900 for an ultrasonic sensing system in which a row select transistor of pixel circuitry is removed according to some implementations. FIG. 9 is similar to FIG. 8 in most respects and provides an alternative example of source addressing. In the example of FIG. 9, diode 716 of FIG. 8 is implemented as a transistor 804 operating as a switch, which can be turned on or off. Transistor 804 can be implemented as a PMOS or NMOS transistor. In this example, the gate of transistor 804 receives an appropriate control signal to cause transistor 804 to switch on or off. A current input of transistor 804 receives AP, and an output of transistor 804 is coupled with the current input of SF transistor 708. When the control signal causes transistor 804 to switch from off to on, AP is delivered through transistor 804 to the current input of SF transistor 708 at the time of reading the sampled signal from sampling node 528.

Figure 10:
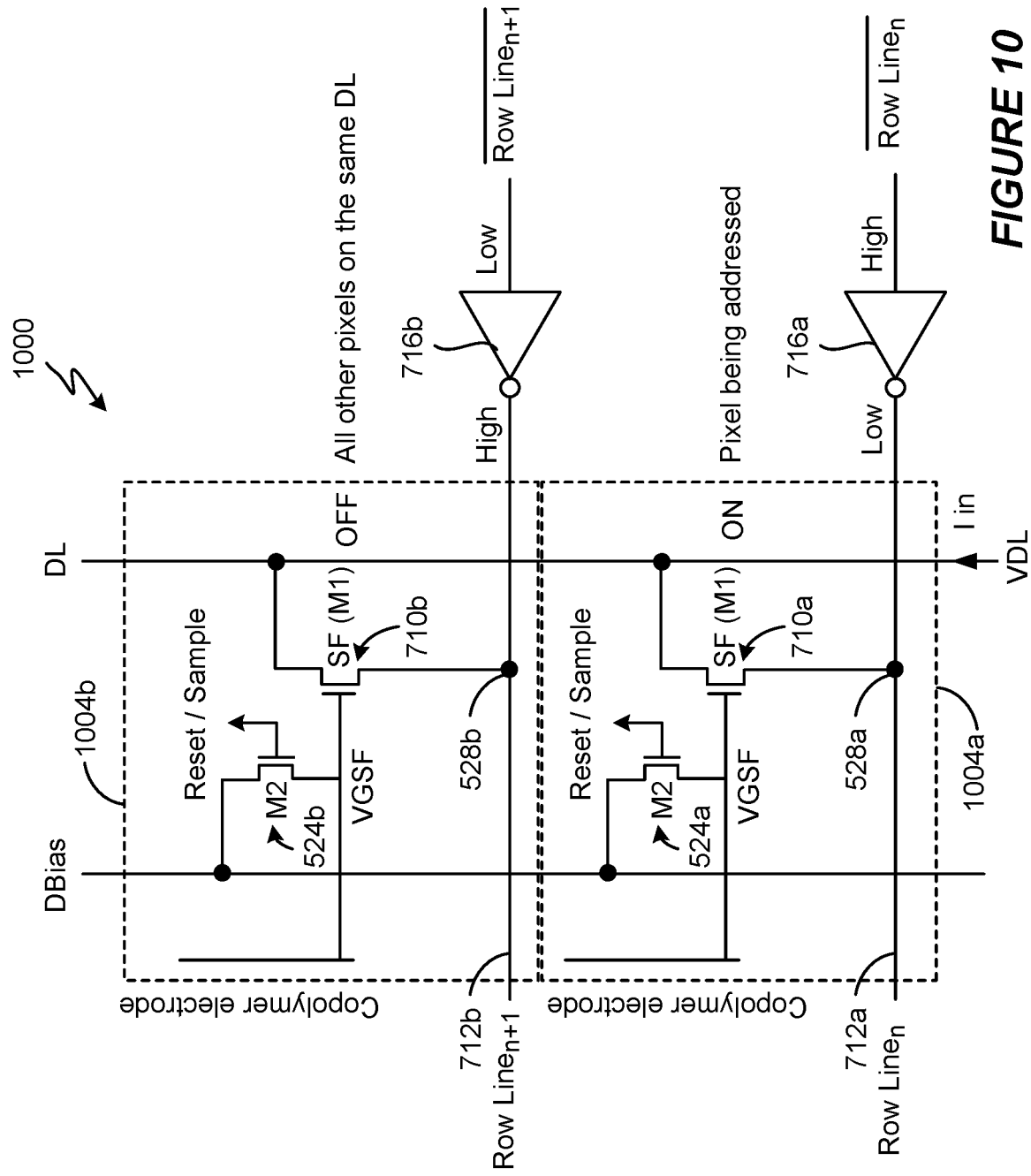
FIG. 10 shows a circuit diagram of an example of a circuit 1000 for an ultrasonic sensing system in which individual pixels are selected for reading using row line signals according to some implementations.

FIG. 10 shows a circuit diagram of an example of a circuit 1000 for an ultrasonic sensing system in which individual pixels are selected for reading using row line signals according to some implementations. FIG. 10 is similar to FIG. 8 in most respects and shows pixel circuitry blocks 1004a and 1004b of respective pixels of two adjacent rows in a pixel array in which source addressing is implemented. In the example of FIG. 10, when addressing a particular pixel for readout, non-addressed pixels on the same data line (DL) are desirably controlled to be off. To this end, a voltage on DL (VDL) can be controlled to have an appropriate level within a designated range. In some implementations, voltages on row lines 712a and 712b in FIG. 10 as well as gate voltages of SF transistors 710a and 710b can also or alternatively be controlled to effectively turn one pixel on and others on the same DL off. In this example, pixel readout can occur for pixel circuitry 1004a, while pixel circuitry 1004b in another row can be effectively turned off when at least three conditions are satisfied:

$$VDL > VGSFmax - Vth, \quad (1)$$

where VGSFmax is the maximum level of the voltage at the gate of transistor 524a or 524b minus the voltage at the source of transistor 524 (VGSF);

$$\text{Row line } V \text{ high} > VGSFmax - Vth, \quad (2)$$

where Row line V high is the voltage of the row line signal on row line 712b, and Vth is the threshold voltage for transistor 524a or 524b; and $$\text{Row line } V \text{ low} < VGSFmin - Vth, \quad (3)$$

where VGSFmin is the minimum level of VGSF, and Row line V low is the voltage of the row line signal on row line 712a.

Figure 11:
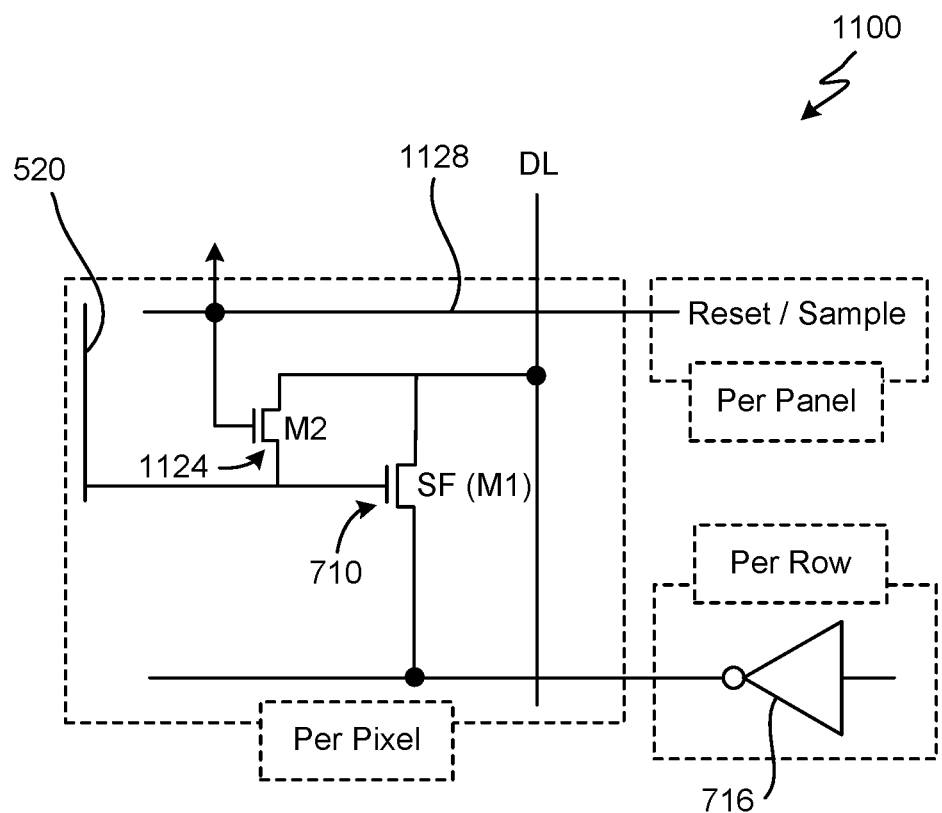
FIG. 11 shows a circuit diagram of an example of a circuit 1100 for an ultrasonic sensing system in which a bias line is removed according to some implementations.

FIG. 11 shows a circuit diagram of an example of a circuit 1100 for an ultrasonic sensing system in which a bias line is removed according to some implementations. FIG. 11 is similar to FIG. 8 in most respects and provides an alternative example in which a pixel can be reset through DL, and the DBias line has been removed. Thus, in some implementations, the circuitry of FIG. 11 can be implemented with only a single column line, DL. In FIG. 11, switch 524 of FIG. 8 has been replaced with a switch 1124 with different electrical coupling—the gate of switch 1124 is similarly coupled with a row line 1128, and the output of switch 1124 is similarly coupled with sampling node 528. However, the current input of switch 1124 is coupled with DL. In this way, during an ultrasonic burst and/or a pixel resetting operation as described above, switch 1124 can be switched on by a row line signal on row line 1128, resulting in a reset voltage on DL being applied to sampling node 528.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module that may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. Pixel circuitry comprising:
   an ultrasonic transducer configured to transmit an ultrasonic signal, the ultrasonic transducer comprising a pixel electrode configured to receive an acoustic signal reflected from an object responsive to the transmission of the ultrasonic signal, the received signal having a first phase;
   a switch configured to have an on state and an off state, the switch having:
      an output coupled with the pixel electrode to define a sampling node,
      an input configured to receive a first row line signal, the first row line signal configured to cause the switch to:
         switch from the off state to the on state at a time of resetting the sampling node,
         have the on state for a delay period following the transmission of the ultrasonic signal, and
         switch from the on state to the off state following the delay period at a time of sampling the received signal to cause a sampled signal having a second phase different from the first phase to be detected at the sampling node, the second phase determined by the delay period; and
   a first transistor having:
      a gate coupled with the sampling node,
      an input configured to receive a power signal, and
      an output coupled with a data line having a voltage different from a voltage of the power signal, the voltage differential configured to enable an output current to flow from the input of the first transistor to the output of the first transistor at a time of reading the sampled signal, the output current being modulated by the sampled signal.

2. The circuitry of claim 1, further comprising:
   a second transistor configured to have an on state of and an off state, the second transistor having:
      a gate configured to receive a second row line signal,
      an input coupled with the output of the first transistor, and
      an output coupled with the data line, the second row line signal configured to cause the second transistor to switch from the off state to the on state to cause the output current to flow from the input of the first transistor to the output of the first transistor at the time of reading the sampled signal.

3. The circuitry of claim 1, further comprising:
   a second transistor configured to have an on state and an off state, the second transistor having:
      a gate configured to receive a control signal,
      an input configured to receive the power signal, and
      an output coupled with the input of the first transistor, the control signal configured to cause the second transistor to switch from the off state to the on state to cause the power signal to be provided to the input of the first transistor at the time of reading the sampled signal.

4. The circuitry of claim 1, further comprising:
   a driver coupled with the input of the switch to provide the first row line signal, the driver configured to control the first row line signal.

5. The circuitry of claim 1, wherein the first row line signal is further configured to cause the switch to provide a reset voltage to the sampling node at the time of resetting the sampling node.

6. The circuitry of claim 5, wherein the reset voltage is a bias voltage provided to a source or a drain of a transistor implementing the switch.

7. The circuitry of claim 1, wherein the delay period is configurable to control phase imaging.

8. The circuitry of claim 1, wherein the switch and the transistor are NMOS TFTs.

9. The circuitry of claim 1, wherein the input of the switch is a gate of an NMOS transistor.

10. A method for ultrasonic phase imaging using pixel circuitry, the method comprising:
    causing transmission of an ultrasonic signal using an ultrasonic transducer having a pixel electrode configured to receive an acoustic signal reflected from an object responsive to the transmission of the ultrasonic signal, the received signal having a first phase;
    controlling a switch configured to have an on state and an off state to:

switch from the off state to the on state at a time of resetting a sampling node at which the switch is coupled with the pixel electrode, have the on state for a delay period following the transmission of the ultrasonic signal, and switch from the on state to the off state following the delay period at a time of sampling the received signal to cause a sampled signal having a second phase different from the first phase to be detected at the sampling node, the second phase determined by the delay period; and controlling a first transistor having a gate coupled with the sampling node, an input configured to receive a power signal, and an output coupled with a data line having a voltage different from a voltage of the power signal, to enable an output current to flow from the input of the first transistor to the output of the first transistor at a time of reading the sampled signal, the output current being modulated by the sampled signal.

11. The method of claim 10, further comprising:

controlling a second transistor having an input coupled with the output of the first transistor and an output coupled with the data line to cause the second transistor to switch from an off state to an on state to cause the output current to flow from the input of the first transistor to the output of the first transistor at the time of reading the sampled signal.

12. The method of claim 10, further comprising:

controlling a second transistor having an input configured to receive the power signal and an output coupled with the input of the first transistor to cause the second transistor to switch from an off state to an on state to cause the power signal to be provided to the input of the first transistor at the time of reading the sampled signal.

13. The method of claim 10, further comprising:

controlling the switch to provide a reset voltage to the sampling node at the time of resetting the sampling node.

14. The method of claim 13, wherein the reset voltage is a bias voltage provided to a source or a drain of a transistor implementing the switch.

15. A non-transitory computer readable medium storing program code to be executed by one or more processors, the program code comprising instructions configured to cause:

transmitting an ultrasonic signal using an ultrasonic transducer having a pixel electrode configured to receive an acoustic signal reflected from an object responsive to the transmission of the ultrasonic signal, the received signal having a first phase;

controlling a switch configured to have an on state and an off state to:

switch from the off state to the on state at a time of resetting a sampling node at which the switch is coupled with the pixel electrode, have the on state for a delay period following the transmission of the ultrasonic signal, and switch from the on state to the off state following the delay period at a time of sampling the received signal to cause a sampled signal having a second phase different from the first phase to be detected at the sampling node, the second phase determined by the delay period; and controlling a first transistor having a gate coupled with the sampling node, an input configured to receive a power signal, and an output coupled with a data line having a voltage different from a voltage of the power signal, to enable an output current to flow from the input of the first transistor to the output of the first transistor at a time of reading the sampled signal, the output current being modulated by the sampled signal.

16. The computer readable medium of claim 15, the instructions further configured to cause:

controlling a second transistor having an input coupled with the output of the first transistor and an output coupled with the data line to cause the second transistor to switch from an off state to an on state to cause the output current to flow from the input of the first transistor to the output of the first transistor at the time of reading the sampled signal.

17. The computer readable medium of claim 15, the instructions further configured to cause:

controlling the switch to provide a reset voltage to the sampling node at the time of resetting the sampling node.

18. An apparatus for ultrasonic sensing using a pixel, the apparatus comprising:

transducer means for transmitting an ultrasonic signal, the transducer means comprising electrode means for receiving an acoustic signal reflected from an object responsive to the transmission of the ultrasonic signal, the received signal having a first phase;

switching means, coupled with the electrode means to define a sampling node, for:

switching from an off state to an on state at a time of resetting the sampling node, maintaining the on state for a delay period following the transmission of the ultrasonic signal, and switching from the on state to the off state following the delay period at a time of sampling the received signal to cause a sampled signal having a second phase different from the first phase to be detected at the sampling node, the second phase determined by the delay period; and reading means having a sampling terminal coupled with the sampling node, an input terminal configured to receive a power signal, and an output terminal coupled with a data line having a voltage different from a voltage of the power signal, for enabling an output current to flow from the input terminal to the output terminal at a time of reading the sampled signal, the output current being modulated by the sampled signal.

19. The apparatus of claim 18, further comprising:

driving means coupled with the switching means for controlling the switching means to switch from the off state to the on state at the time of resetting and switch from the on state to the off state at the time of sampling.

20. The apparatus of claim 18, wherein the delay period is configurable to control phase imaging.

* * * * *